Sept. 2, 1969 J. A. KOBEL 3,464,642

HUB ASSEMBLY

Filed Nov. 21, 1967

INVENTOR
JOSEPH A. KOBEL

Patented Sept. 2, 1969

3,464,642

HUB ASSEMBLY

Joseph A. Kobel, Floral Park, N.Y., assignor to Potter Instrument Company, Inc., Plainview, N.Y., a corporation of New York Filed Nov. 21, 1967, Ser. No. 684,698
Int. Cl. B65h *17/02*
U.S. Cl. 242—68.3 4 Claims

ABSTRACT OF THE DISCLOSURE

A self-locking hub for a magnetic tape reel on a transport in which a movable flanged housing carries a friction element. A central spring loaded button has an over-center lever which expands a friction element carried by the housing so as to retain the reel. A tumbler means locks the housing in place.

Background of the invention

The field of the present invention is concerned with magnetic tape transports on which tape reels are abruptly started and stopped many times.

Assemblies for mounting tape reels are known in the prior art. For example, U.S. Patent No. 3,272,452 shows a reel held on a housing by a clutch arrangement. It is known from this patent to utilize arcuate friction clutch elements and hand actuated levers for operating the clutch elements.

One feature of the present invention is that it allows means for quickly mounting and demounting a reel on a hub and for positively locking it in position so as to resist axial shock loads to which the reel may be subject.

Another feature of the invention is that it provides for easy and accurate alignment of the hub on the shaft.

Summary of the invention

The present invention utilizes an elastomeric band to frictionally engage the reel. The assembly is constructed so that the reel is locked in place automatically as it is placed on the hub. A reel can be readily mounted and disengaged with one hand. The hub assembly is provided with means for accurate alignment of the assembly on the shaft.

Having briefly described this invention, it will be described in greater detail along with other objects and advantages in the following detailed description of a preferred embodiment which may be best understood by reference in the accompanying drawings. These drawings form part of the instant specification and are to be read in conjunction therewith. Like reference numerals are used to indicate like parts in the various views.

The drawings are to be understood to be more or less of a schematic representation for purposes of illustration.

Description of the preferred embodiments

Figure 1:
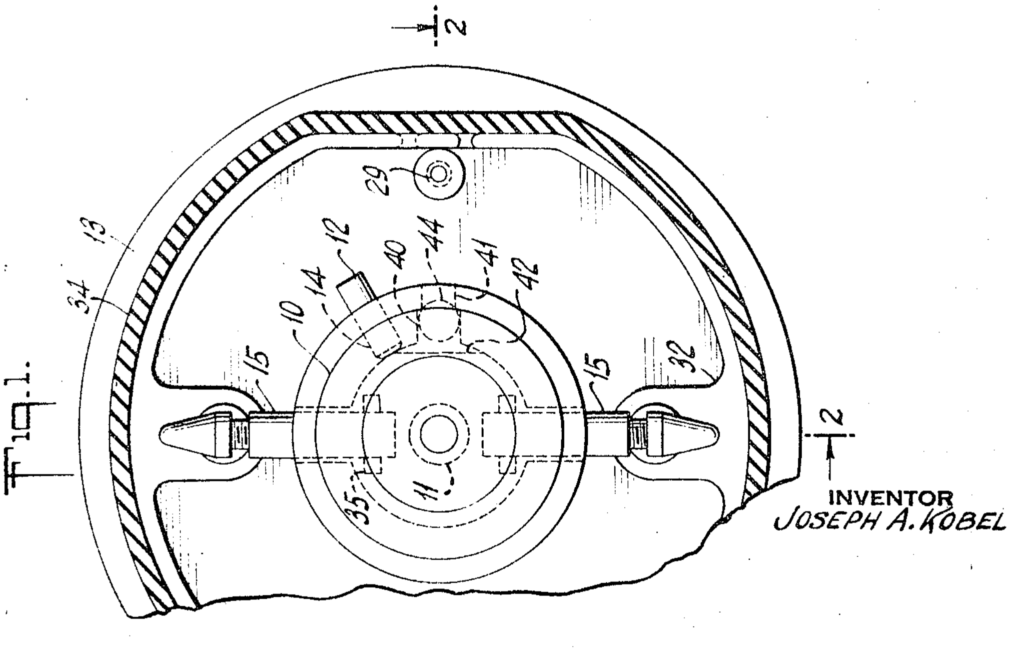
FIGURE 1 is a partial plan view of an apparatus constructed according to the present invention.

Referring now to FIGURE 1, a center hub 10 fits tightly on a shaft 11 and is fastened securely thereto by two screws (not shown). A flanged housing 13 fits over the hub 10 and is axially movable relatively to the hub. A pin 12 is press fitted in the housing 13, engaging an elongated slot 14 in the center hub. The pin keys the housing to the center hub and prevents rotation of the housing relative to the hub. The shaft is operatively connected to a motor (not shown). A pair of oppositely disposed over center arms 15 are operable to radially expand pivotally connected shoes in order to force an elastomeric band 34 into frictional engagement with a tape reel in a manner to be described more fully herein.

Figure 2:
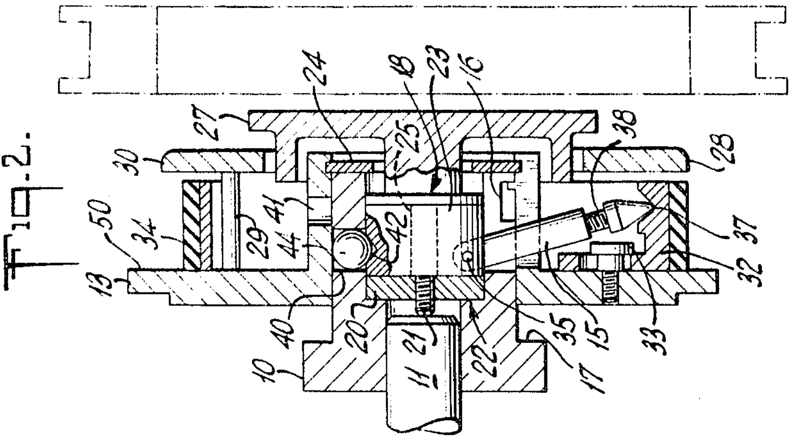
FIGURE 2 is a view of a quadrant A—A of FIGURE 1 showing the disposition of the various components prior to placement of a reel on the assembly, including a knob and cover which are not shown in FIGURE 1.

Referring now to FIGURE 2, flange housing 13 is shown fitted over the center hub 10. The housing is slideably mounted on the center hub and keyed to the hub so that it is caused to rotate with it. The housing has a lug 16 which engages a shoulder in hub 10 so that the housing cannot slip off the end of the hub. Shoulder 17 serves as a stop for the housing when it is pushed toward the shaft.

The center hub has an enlarged cylindrical hollow portion 18 at its center, slightly larger than the diameter of the shaft 11. A plate 20 is securely fitted into the bottom of the hollow portion so that it caps the end of the shaft. A screw 21 engages the plate in a through hole in the center of the plate. The plate rests against the shoulder 22 formed by the change in cross section of the center bore.

Within the enlarged hollow portion 18 is located a cylindrical button 23 that can slide toward and away from the shaft. Pinned to the button 23 are the pair of oppositely disposed over center arms 15.

A retaining ring 24 is attached to the hub and serves as a stop. A compression spring 25 located within the button urges the button away from the shaft. Knob 27 is attached to the button.

A cover 28 is attached to the housing 13 by a screw, through spacer 29. The outer edges 30 of the cover are tapered to facilitate placement of the reel. The tapered edges guide the reel into proper position on the housing.

Two shoes (see also FIGURE 1) designated as 32 are attached to the housing by screws 33. About the periphery of the shoes is the elastomeric band 34. The material is preferably formed in a continuous endless band and has a high friction coefficient. The shoes are movable toward and away from the center hub. It will be appreciated that as the shoes move outward, away from the center hub, the band 34 expands and engages the reel (shown in phantom lines). Each shoe is associated with a lever 15 which is typically connected swingably on a pin 35 mounted in the button. The opposite end of the lever seats in a pivot 37 in shoe 32. An adjusting screw 38 is typically provided in the end of the lever.

The center hub construction includes a through hole 40 located as shown. The housing similarly includes a hole or notch 41 which is aligned radially with the hole in the hub. The button 23 has a notch 42 (seen in FIGURE 1) radially aligned with holes 40 and 41. A tumbler 44 is disposed in hole 40 and comprises a ball bearing with a diameter slightly smaller than the hole 40 to allow movement and slightly larger than the thickness of the center hub at the point at which the hole is located to allow the ball bearing to engage the button or the housing. A suitably shaped pin could be utilized in place of the ball bearing. Or the tumbler means could be any of a variety of means, for example, a spring and pin arrangement.

The workings of the apparatus may be described with reference to the FIGURES 2 and 3.

FIGURE 2 shows the assembly in the position ready to receive the reel. The reel is slid over the housing until it comes to rest on the flange bearing surface 50. As the reel is pushed against the bearing surface, the housing is urged against flange 17 on the center hub. The shoes are urged outward by the action of the levers. Said another way, the elastomeric band is pressed against the reel by the levers due to the relative movement between the housing and the button. As the housing moves down, the hole in the wall of the housing becomes aligned with the hole in the center hub and allows the ball bearing to be displaced by the button as the spring 25 pushes the button up. As the button comes up so that the notch 42 is no longer aligned with the hole in the hub, the ball engages the hole 41 in the housing and holds it in place. Now, as the button comes up, it moves the pivotal point of the levers over center of each other which in turn causes the levers to push outward against the shoes and secure the reel while assisting in locking the assembly.

Figure 3:
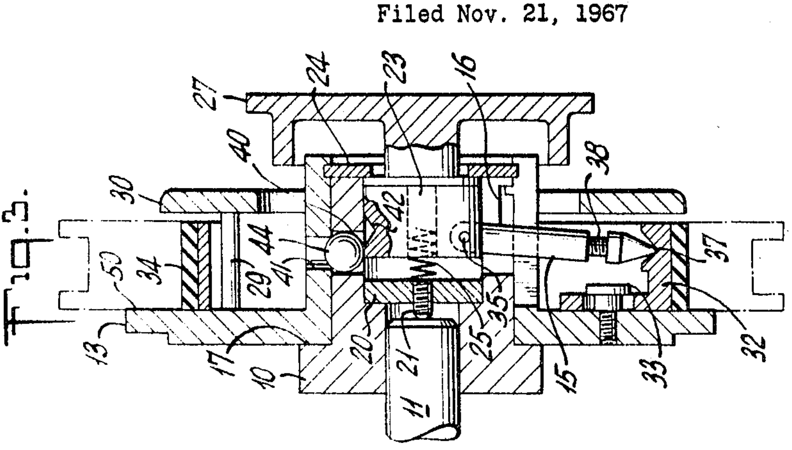
FIGURE 3 is a view similar to that of FIGURE 2 showing disposition of the various components when the reel is fully installed.

FIGURE 3 shows the reel installed. To release the reel, the knob is simply pressed down. This moves the pivotal points of the lever, relaxing the outward pressure on the band, and re-aligns the notch with the ball bearing, allowing the housing to return to its original position. The reel can then be easily lifted off the assembly.

Although the present invention has been described with reference to specific apparatus, it will be appreciated by a person skilled in the art that a wide variety of changes may be made without departing from the scope of this invention. For example, certain features of the apparatus may be used independently of others and equivalents may be substituted for the apparatus elements, all within the spirit and scope of the invention as defined in the appended claims.

What is claimed is:

1. A tape reel hub in which an over-center, toggle actuated expansible band engages the inner surface of the reel bore comprising, in combination:

a housing carrying said expansible band, an axial bore in said housing, an inner hub affixed to a shaft and fitting within the bore of said housing, said housing being axially moveable with respect to said hub between a first position in which said band is contracted and a second position in which said band is expanded, an axial bore in said inner hub, a spring-loaded button fitting within said inner hub bore, said button removable with respect to said inner hub between a first position in which said band is contracted and a second position in which said band is expanded, means for locking said button in its first position against the force of the spring urging it to its second position, means for locking said housing in its second position and simultaneously unlocking said button which moves to its second position, said housing locking means responsive to the return of said button to its first position to unlock said housing, whereby said housing is automatically locked in place when said expansible band is expanded and said housing is released by returning said button to said first position.

2. A tape reel hub as in claim 1 wherein said housing has a flange that extends beyond the periphery of said expansible band to engage said reel, whereby the placing of said reel on said hub moves said housing to its second position.

3. A tape reel hub as in claim 2 wherein said means for locking said button includes a tumbled carried by said inner hub, a notch in said button which is alligned with said tumbler in the first position of said button, and said means for locking said housing includes said tumbler and a notch in said housing aligned with said tumbler in said second position of said housing.

4. A tape reel hub as in claim 3 wherein said tumbler is round and said notches form camming surfaces to move said tumbler.

References Cited

UNITED STATES PATENTS

| | | | |
|---|---|---|---|
| 3,272,452 | 9/1966 | Cohen | 242—72 |
| 3,366,343 | 1/1968 | Messamer et al. | 242—68.3 |

NATHAN, L. MINTZ, Primary Examiner